(12) United States Patent
Kerouac

(10) Patent No.: US 6,352,855 B1
(45) Date of Patent: Mar. 5, 2002

(54) IN-VESSEL COMPOSTING PROCESS AND APPARATUS

(76) Inventor: Paul E. Kerouac, PTL Way, Hollis, NH (US) 03049

( * ) Notice: Subject to any disclaimer, the term of this patent is extended or adjusted under 35 U.S.C. 154(b) by 0 days.

(21) Appl. No.: 09/481,610

(22) Filed: Jan. 12, 2000

Related U.S. Application Data

(63) Continuation-in-part of application No. 09/398,573, filed on Sep. 17, 1999, now Pat. No. 6,071,740.
(60) Provisional application No. 60/170,566, filed on Dec. 14, 1999, provisional application No. 60/166,452, filed on Nov. 19, 1999, and provisional application No. 60/115,736, filed on Jan. 12, 1999.

(51) Int. Cl.[7] ............................................. C12M 1/02
(52) U.S. Cl. ........................... 435/290.3; 435/290.4; 71/11
(58) Field of Search ..................... 435/290.1, 290.2, 435/290.3, 290.4; 71/11

(56) References Cited

U.S. PATENT DOCUMENTS

| 2,127,137 A | 8/1938 | Price |
| 2,297,804 A | 10/1942 | Siegfried |
| 3,220,804 A | 11/1965 | Bachmann et al. |
| 3,245,759 A | 4/1966 | Eweson |
| 4,962,034 A | * 10/1990 | Khan ........................ 435/262 |
| 5,047,349 A | 9/1991 | Eweson ...................... 435/377 |
| 5,407,809 A | 4/1995 | Finn ............................ 435/41 |
| 5,534,437 A | * 7/1996 | Arrau ..................... 435/290.3 |
| 5,583,045 A | * 12/1996 | Finn ....................... 435/290.1 |
| 5,591,635 A | 1/1997 | Young et al. ............ 435/286.1 |
| 5,605,834 A | 2/1997 | Eberthson et al. ....... 435/290.3 |
| 5,661,031 A | 8/1997 | Murphy et al. .......... 435/290.3 |
| 5,700,687 A | * 12/1997 | Finn ............................ 435/266 |
| 5,766,935 A | 6/1998 | Seagren .................. 435/290.2 |
| 5,846,815 A | * 12/1998 | Wright .................... 435/290.4 |
| 5,945,332 A | * 8/1999 | Fors ........................... 435/262 |
| 6,110,727 A | * 8/2000 | Widmer et al. ............. 435/262 |

* cited by examiner

Primary Examiner—David A. Redding
(74) Attorney, Agent, or Firm—Vernon C. Maine; Scott J. Asmus

(57) ABSTRACT

An in-vessel composting apparatus and process for continuous processing of food waste into a two component end product consisting of a bulk organic compost material and a compost-rich, liquid tea. The apparatus consists of a shredder/particle sizer feeding a horizontal drum having at least three chambers with connecting ports of sequentially increasing diameter, and through to a bulk collection container. The apparatus is further equipped with motorized drum rotation and provision for draining excess fluid from the first chamber, holding a batch volume at elevated temperature for a period of time, and then percolating it through the finished compost product in the third or final chamber to make compost tea.

20 Claims, 6 Drawing Sheets

IN-VESSEL COMPOSTING PROCESS AND APPARATUS

This application claims priority to U.S. provisional applications No. 60/115,736 filed Jan. 12, 1999, No. 60/166,452 filed Nov. 19, 1999, No. 60/170,566 filed Dec. 14, 1999, and is a continuation-in-part of U.S. application Ser. No. 09/398,573 filed Sep. 17, 1999, and now U.S. Pat. No. 6,071,740.

BACKGROUND OF THE INVENTION

1. Technical Field of the Invention

This invention relates to reduction and contained decomposition of organic waste material, and more particularly, to a unitized process and apparatus for reducing and in-vessel composting raw food waste and biodegradable eating utensils and trays, yard waste, and newspapers, in combination with associated organic packing materials such as cardboard and paperboard containers, into two useful compost components, one liquid and one relatively dry.

2. Background of the Invention

According to published sources, in all, the United States generates approximately 208 million tons of municipal solid waste per year. Public and private sectors, alike, are facing increasing cost and difficulty in disposing of their enormous and increasing tonnage of solid waste and garbage in an environmentally sound and economically acceptable manner. Historically, refuse or garbage has been collected and disposed of by one of several inexpensive means, such as open burning, dumping in waterways, or dumping in common landfills.

As the ecological impact of such practices became evident, the demand for safer practices grew. Three methods emerged as environmentally suitable means for safe refuse disposal: (1) sophisticated landfills with costly structures and controls designed to prevent leaching into surrounding ground water; (2) controlled incineration; and (3) composting in which the compost product has a reduced toxicity suitable for subsequent disposal in a landfill. However, according to data from the United States Environmental Protection Agency, the number of operating landfills in the U.S. has dropped by more than half in the past ten years.

Although municipal incinerators are more environmentally friendly than they were a generation ago, they continue to release gases and solid particles that may harm human health, damage property, and kill plants. The biggest components of all municipal solid waste are compostable; yard waste, corrugated boxes, and food waste.

The benefits of composting have long been known. Though not a fertilizer, it is a useful soil conditioner that improves texture, air circulation, and drainage. Compost moderates soil temperature, enhances nutrient and water-holding capacity, decreases erosion, inhibits weed growth, and suppresses some plant pathogens. High quality compost is being used for and marketed as a soil amendment and as mulch for landscaping, farming, horticulture, and home gardens. Compost can also be used as landfill cover or in land reclamation projects.

There is a large body of art relating to in-vessel composting, some providing useful descriptions of the basic biological process. Existing in-vessel composters typically have one or more of the following general short-comings. (1) the system is too complex and the cost to purchase and operate is cost prohibitive to small businesses and organizations, (2) the system requires an extended processing time of generally greater than three weeks, such that the necessary capacity of the system becomes cumbersome and/or restrictive, or (3) the process produces output material which is less than 60% composted when removed from the vessel, requiring additional composting and processing time prior to curing.

There remains a need for an affordable, simple to operate, energy efficient, in-vessel composting system that substantially reduces the volume and weight of the input materials, and processes a useful end product of commercial value.

SUMMARY OF THE INVENTION

Disease-suppressive compost is not made by accident. It comes about by carefully monitoring the atmosphere inside of a composting vessel to ensure that the temperature, moisture, and oxygen levels are all maintained at proper levels throughout the entire process. Varying species of bacteria present in the composting vessel will break down and organic materials into the output compost mixture. And, as temperatures rise and fall in the compost, different bacterial species will become more or less active. Psychrophilic bacteria, mosophilic bacteria and thermophilic bacteria each operate best within specific temperature ranges. Furthermore, with sufficient oxygen, microorganisms produce energy, grow quickly, consume more material and make nutrients available for plant growth. Without oxygen, aerobic bacteria die off and anaerobic bacteria take over. They will break down the material, but more slowly, and with an accompanying unpleasant odor. Offensive odors are produced only when the material in the system is allowed to become anaerobic, not a normal condition in the practice of this invention.

To provide a simple, reliable, efficient, in-vessel composting system, it is most useful to optimize the apparatus to a selected, well-defined waste stream, thus reducing the processing variables and simplifying the apparatus and operation. This technique offers the user a composting process and apparatus that produces a more consistent, higher quality, nutrient rich, end product.

The invention, in it's simplest form, is an integrated or unitized reduction and composting process and system for the recycling of food waste and associated organic waste materials such as cardboard and paper board packaging materials, into a nutrient-rich liquid compost "tea" and bulk organic end product that are manageable, useful, and inoffensive. This waste stream provides an abundance of nitrogen and moisture, both important in the process. The amount of carbon and moisture absorbing bulk input can be varied, based on process conditions, by adding supplemental organic materials such as cardboard and paper board. The invention will accept traditional bulking agents such as sawdust and wood chips if desired, but is specifically designed to shred corrugated cardboard, found in many waste streams such as that of restaurants and supermarkets, to optimum size for the composting process of the invention.

The system is tolerant of a limited amount of incompatible solid contaminants that may be present in particular applications or installations. The invention utilizes a continuous four-step process which has approximately a three week throughput cycle, consisting of shredding to the optimal particle size, then mixing and composting the bulk materials through a three step, in-vessel process, while draining the excess liquid at the first stage and reprocessing it into compost tea through the finished bulk product. The apparatus is self-contained to provide for continuous input of raw waste, generating a bulk output of nutrient-rich, organic liquid and bulk compost materials of significantly less total volume and weight than the input materials.

Particle size is an important aspect of the composting process. If the waste particles are too large, the relatively small ratio of surface area to mass inhibits the start of the process. Shredding the material at the point of input offers a large advantage in this respect. On the other hand, if the input material is shred too small, porosity and the ability of the material to be aerated is greatly diminished. As a result, bacteria is less able to act. For the waste stream to which this invention is directed, an optimal particle size has been determined to be about 3 cubic inches. A shredder in the infeed stage provides for this requirement.

After the shredder sizes the input material, the material is directed into the first chamber of a three-chambered rotating drum. While three different drums would offer some flexibility in the control of the process, one drum and drum drive provides efficiency in the design that is reflected in cost and simplicity. A drainage mechanism in the first chamber diverts excess liquid into a batched, bypass system for later processing through the finished bulk compost product into compost tea. The drum and liquid handling systems are encased in an insulated enclosure, assuring that there will always be a surplus of heat. The apparatus is arranged on a base frame with the drum oriented horizontal, again contributing to simplicity.

Periodic and temperature-based drum rotation, in conjunction with the periodic operation of an exhaust fan for air exchange, provides necessary cooling control within the drum. Oxygen, present in the specified waste stream materials and moisture content, and in the makeup air supplied by the exhaust fan, is present at adequate levels to sustain the composting process. Aeration for drying, cooling, and supplying oxygen, is accomplished by the incremental rotations of the drum throughout the process.

Chamber to chamber progression is intentionally restricted to gradual, full diameter tumbling of the materials in each chamber, with a continual incremental spill over through a slightly larger diameter annular, axial port into the next chamber. The continuous spill over into the next chamber permits the remaining material to maintain a small but consistent forward progression through the drum as it tumbles, without inconsistent acceleration of portions of the material by intentionally angled blades, buckets or augers. This assures that the process progresses at a consistent rate in each chamber, and that the end product will be a homogenous, fully composted end product. A substantial residual volume of material is retained in all chambers at all times, further forward movement through the system and discharge of end product being dependent on regular, continuing input at the infeeding end.

Once inside the first chamber, the material will reside there for approximately 2 to 5 days as it is slowly churned into a homogeneous mixture, the excess liquid draining out through ports into a collection system, with each new batch of input material being quickly engulfed in the on-going composting process. A small mixing vane or like feature promotes tumbling, but does not contribute directly to forward movement through the system. Heat is readily generated by the active thermophilic bacteria, supplied with nitrogen and carbon, both inherently present in the mixture. The material is advanced to the next chamber as described above.

The center or second chamber is the main composting furnace. Having been pre-conditioned in the first chamber, the new material is quickly fully absorbed in the process. The temperature within this second chamber is maintained within the range of 100 to 150 degrees Fahrenheit, preferably higher than 131 degrees Fahrenheit to ensure pathogen destruction if the waste food mix includes meats and dairy products. It is also necessary to maintain this temperature range to kill any seeds present within the waste stream. In contrast, from practice it was found that waste stream materials other than those containing pathogens, such as fruits, vegetables, paper, etc. will degrade to compost at temperatures as low as 95 degrees Fahrenheit due to the activity of mesophilic bacteria.

However, it should be noted that while there are no pathogenic materials to contend with, seeds within the waste stream will not be killed at such a low temperature. Just as important, the temperature of the mixture material should not exceed 158 degrees Fahrenheit as the beneficial anaerobic bacteria will begin to die off as temperatures rise above this level.

The volume of the second chamber is such that during continuous use and operation of the system, the bulk of the mixture is retained for approximately 4 to 10 days while the composting action reduces the volume of the output mixture by typically as much as 85 to 90 percent. As a result of this decrease in volume, the density of the material is increased.

A mixing vane or similar limited internal structure, as in the first chamber, promotes tumbling only. A small amount of mixture is being regularly passed into the third chamber, again by the incremental rotation and gradual flow through the next larger port. A substantial amount of residual material remains working in the second section at all times.

By the time the material reaches the third chamber, its volume has been greatly reduced due to the composting process. Due to the reduction of the material within the first two chambers, material flows into the third chamber at a much slower rate. The material, therefore, is not as quickly displaced from the third chamber. As a result, material resides in the third chamber for a longer duration, allowing the material to finalize the composting process and begin to cure. This chamber is equipped with a greater number of vanes or equivalent structures to increase tumbling and to reduce and break up any clumps in the compost material received from the second chamber.

In practice, even with less than ideal peak temperatures through the first and second chambers, seedling vegetation growth has been witnessed in the third chamber material. This is noteworthy because vegetation is unable to grow in active, unfinished compost material. This demonstrates that resultant material in the third chamber has completed the composting process and is partially cured prior to exiting through the third chamber's output port.

Meanwhile, the excess liquid is batched and held at the same elevated temperature as the middle chamber, for three days or more, or in accordance with regulatory requirements, then percolated through the third chamber to be enriched by the highly concentrated nutrients present there, and continuously drained from there into a final collection system for batch removal on a periodic basis.

The Control of Excess Water and the Making of Tea

Expanding now on the compost tea aspects of the above disclosure, it as been determined that excessive liquid in the food waste materials hinders the biological activity of the composting process in the drum. Additionally, there is a significant commercial interest in the "tea", a liquid product issuing from composting processes, if it can be produced with a consistently high degree of purity and quality.

To these ends, one purpose of the invention is to provide a dual track, liquid and bulk waste composting process that removes excess liquid from the food waste entering the drum so the second chamber in particular does not have excess liquid which will hinder the biological activity of the dry track bulk matter composting process. Another goal is to process the liquid into a useful end product, so called "compost tea", in a parallel path, liquid track, within the same overall apparatus, and to coordinate the processing of the tea for collection on the same schedule as the relatively drier, bulk matter compost product.

The invention described above includes means for extracting excess liquid from the first chamber of the drum, maintaining the liquid at elevated temperature for at least 72 hours, and then percolating it through the final stage compost product in the third chamber of the drum and draining it into a separate holding tank below the drum. The "tea" product is then available for removal and reuse as a liquid supplement to various organic and gardening processes.

As a result of the lower moisture content of the food waste during its processing in the drum, the final compost product is greatly reduced in volume, and is of generally better and more consistent quality and more easily handled than otherwise.

It is an object of the invention to provide an apparatus for the efficient, in-vessel composting of foot waste and associated organic waste such as cardboard and paperboard packaging materials.

It is another object of the invention to create, essentially from food waste, two useful compost products, one being a liquid "tea" product and the other being a relatively drier, bulk matter compost product.

Still other objects and advantages of the present invention will become readily apparent to those skilled in this art from the following detailed description, wherein I have shown and described only a preferred embodiment of the invention, simply by way of illustration of the best mode contemplated by me on carrying out my invention.

DESCRIPTION OF THE PREFERRED EMBODIMENT

Figure 1:
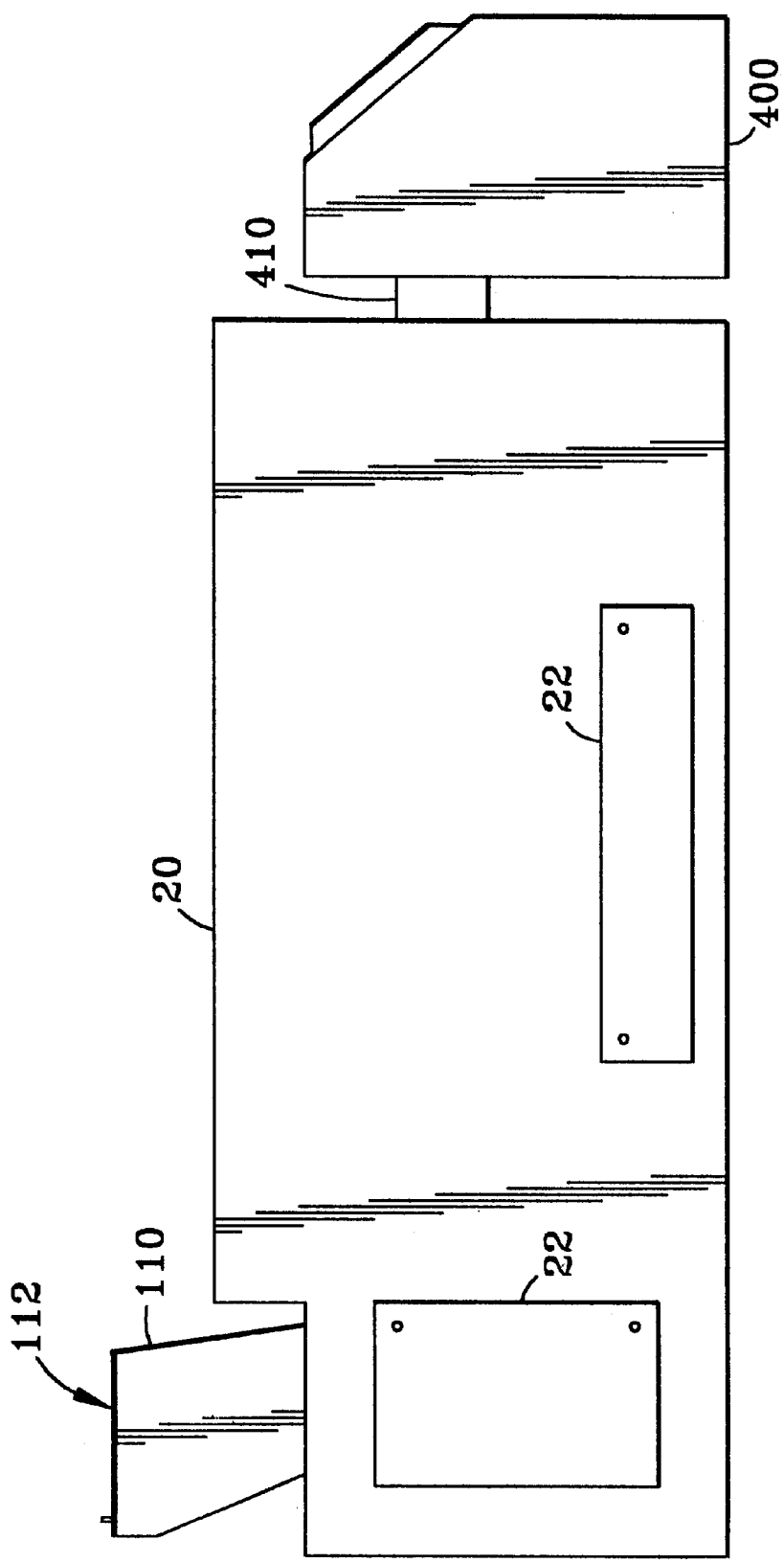
FIG. 1 is a side elevation of the preferred embodiment, showing the front end and hopper, the system enclosure, and the recovered materials compost container at the back end.

The invention is susceptible to many variations, including scaling for capacity, in so long as process parameters and control logic are maintained. Accordingly, the drawings and following description of the preferred embodiment are to be regarded as illustrative in nature, and not as restrictive.

Process constraints include particle size, relatively significant retention quantities and dwell time in each chamber, sufficient air changes and aeration, and temperature control. Apparatus variables to be considered are the incremental amount and frequency of drum rotations required to control the heat, in combination with size and ratio of chamber length to drum diameter, and the port sizes. The preferred embodiment is intended to handle an input volume waste stream of up to one ton per day, or about seven tons per week.

The five principal components of the apparatus of the preferred embodiment consist of an infeed section, a multichambered drum, a closed compost container, a liquid handling system, and a process control system. The infeed section, drum, liquid handling system, and process control system are mounted on a base frame and suitably enclosed and insulated to operate as a unitary composting system. The closed compost container is mated to the back of the drum to receive and collect the bulk compost product outflow, but is free standing so as to be convenient for periodic emptying or exchange when full. The liquid product, or tea, is held in a final collection tank within the enclosure, for pumping or gravity flow removal when required. The enclosure is substantially closed to drafts, but is not pressure proof, natural outgassing occurring by design in the area of the back end and compost container, and forced ventilation drawing fresh air in through the same vents.

The infeed section has a feed hopper and lid, a material shredder/particle sizer powered by an electric motor, and an infeed auger likewise powered by an electric motor. The drum section consists of a large, horizontally oriented, three chamber drum, mounted on the base frame so as to be ratable by a motorized drum drive system. The chambers are divided by substantially planar partitions, perpendicular to the axis of the drum. The drum has a relatively small axial port at the front end, and successively slightly larger axial openings or ports in the interior partitions and in the back end wall.

The liquid handling system consists of five sections or subsystems; (1) drainage ports on the drum wall of the first and final chambers of the drum, (2) an input end drainage collection subsystem and port clearing air compressor, for receiving the liquid outflow from the first chamber drainage ports and pumping it into a first or primary holding tank, (3) a batch filled, heated, and time-based emptied, main holding tank, (4) a batch filled, slow drainage, percolation feed tank feeding into the top-side drainage port of the final chamber of the drum, and (5) a final liquid collection and holding tank for receiving the tea draining out of the final chamber drainage ports, equipped with an evaporator for reducing the liquid to a yet higher concentration of nutrients.

The raw materials path is into the hopper, through the shredder/particle sizer, through the auger into the first chamber where excess liquid is gradually drained off into the liquid handling system, then successively through the second chamber for the majority of its composting activity, the third chamber for recombination with finished product and percolation effects of the liquid processing, and into the compost container.

The drum is horizontally mounted on the base frame. The graduated sizes of the axial ports provides for a retained volume of working materials in each section, and a gradual spillover of excess amounts into the next successive chamber and then into the compost container. In operation, as the drum is rotated in successive, incremental amounts, the material tumbles around the inside diameter of each chamber several times and gradually advances to the next port.

The process control system includes an operator's station, process controller and process sensors including a temperature sensor and an optional oxygen or carbon dioxide level sensor. The controller also receives inputs from the operator switch and various safety switches on the drum operation and various liquid level and temperature sensors of the liquid handling system. The controller output controls the shredder motor, the auger motor, the drum drive system, the pumps, compressor and evaporator of the liquid system, and an exhaust fan air changing system equipped with a biofilter to assure non-odorous emissions. The exhaust fan duct is connected at the front end of the system so as to exhaust interior air and draw makeup air in from the back end.

An optional oxygen or carbon dioxide sensor is located in the airflow path to the exhaust fan. The temperature sensor is located at the base of the drum in the area of the center chamber. The temperature sensor assembly alternately bears on the exterior wall of the center chamber of the drum when it is not rotating, and is lifted clear by a cam linked to the drum drive system when the drum is rotating. The sensor or sensors are located at point rotationally forward of bottom dead center where the general center of mass of contained material is concentrated by the rotating action of the drum. At this location, the sensor assembly provides an indication of the temperature of the material at the height of its exothermic process, when the drum is stationary, and measures the ambient air temperature when the drum is in motion.

The operator's station is provided with a temperature readout and/or high and low temperature indicator lights, and with oxygen or carbon dioxide level readouts if either sensor is installed.

To conduct a periodic loading of materials into the apparatus, assumed to be as often as daily or several times a week, the operator opens the hopper, which automatically starts the exhaust fan to prevent outflow of fumes through the hopper, loads it with waste material, and closes the lid. The operating switch is then engaged to start the shredder and auger and a process cycle of incremental rotation and exhaust fan operation. When the hopper is empty, the shredder is disengaged.

The shredder reduces the material into particles of not more than one by one by three inches, the maximum size calculated to facilitate efficient and complete composting in accordance with the process and apparatus of the invention. Particles larger than about four cubic inches begin to reduce the speed and effectiveness of the bacterial action in the first chamber. Smaller is better.

Disengaging the operator switch turns off the shredder and the auger, and initiates a standard process cycle of drum rotation and exhaust fan operation, conducted by the controller and based on process conditions and predetermined or programmable times and process limits. The liquid handling system is intentionally limited to its maximum batch capacity by an overflow from the primary holding tank back into the first chamber to alleviate variations in liquid content of the raw input materials, and otherwise runs independent of the pace of drum rotation cycles.

It has been found useful to add about one to three yards of a starter batch or resident compost to each of the first two chambers, to facility a quick initial startup of the process in a new install or restart situation. The specified input materials for which the invention is intended, normally contain a sufficient amount of moisture, nitrogen and the required bacteria to maintain the composting process within the drum section as the working volumes in each chamber are accumulated and the excess is advanced to the next chamber. The process is exothermic and requires mainly only oxygen to be sustained to completion. The enclosure is well-insulated, so the primary requirement of the apparatus is to remove excess $CO_2$, $H_2O$ (water vapor), and control the heat, and add sufficient makeup air to supply the oxygen needed in order to sustain the process.

The first chamber serves to mix the shredded materials into an homogenous mixture, stabilize the temperature and moisture content, and allow the composting process to engage the new material. It has a single, straight vane running lengthwise on the drum wall, parallel to the axis of rotation, which imparts tumbling action to the materials, but only once every complete rotation or once in three process cycles.

The second, largest chamber accept s the prepared material into a dedicated composting chamber, relatively isolated and insulated by the first and third chambers from exterior factors, where the bulk of the composting takes place, and likewise has a single mixing vane to assure tumbling of the materials. The third chamber is a smaller, final holding station that provides additional time for mixing, percolation of the reprocessed excess liquid, and final drying and cooling of the composted, final product to a uniform consistency, with a steady rate of outflow to the compost container. The third chamber has three, equally spaced mixing vanes to maximize tumbling of the materials at this stage.

The main purpose of the vanes in the first and second chambers is to promote and ensure tumbling within these drum sections, not for the forward progression of the material from one chamber to the next. As found in practice, any forward-inducing spiral or angle in these vanes will cause the composting material to progress through the drum too quickly, causing the material to traverse the three chambers and be discharged prior to fully completing the composting process.

Moisture is generally overabundant in the materials for which the apparatus is specified. Excessive moisture content in the materials, more than 60–65%, can inhibit the process and is reflected in reduced temperature in the working material. The liquid handling system is sized to handle the anticipated normal moisture content. However, supplement bulk material, mainly in the form of cardboard and other biodegradable packaging materials, is readily available to prospective users of the apparatus to absorb and balance the excessive moisture content of the primary materials if needed.

Assuming ambient outside air as a starting medium and makeup medium, increasing carbon dioxide levels in the drum will indicate consumption of oxygen. When the level of $CO_2$ goes high, it can be assumed that there is not sufficient remaining oxygen to sustain the process at an efficient rate, and an air change is required. However, it should be noted that the specified input materials, and the operation of the apparatus as described here, can be expected to provide sufficient oxygen under all but extreme circumstances.

The controller is programmed to periodically execute a process cycle of limited drum rotation, a range of ½ to 1 turn being adequate, with ¾ turn being that of the preferred embodiment, which is calculated to be sufficient to roll and turn the materials in each chamber to expose a new layer to the available oxygen, and to advance any excess liquid towards the next downstream port. The stationary time or period between automatic rotation is calculated to permit the composting process to progress with the available oxygen, retaining most of the heat generated and outgassing at the rate of generated, at the back end of the apparatus. The period of repetition for the preferred embodiment is every three hours, but will likely be superseded by on-demand provisions for additional rotation and make-up air based on exceeding the high temperature limits or carbon dioxide levels in the drum.

The rotation cycle also includes concurrent operation of the exhaust fan with for air circulation in the drum. The flow rate of the fan and duration of operation as relates to the drum rotation, assures adequate air exchange and aeration consistent with the progress of the process. For the preferred embodiment, the fan on time is the same as incremental drum rotation time, typically less than a minute.

The preferred materials temperature, $T_M$, operating range is between 130 and 150 degrees Fahrenheit. The materials temperature is being monitored through the wall of the drum whenever the drum is not rotating. Whenever the materials temperature $T_M$ is interpreted as exceeding 150 degrees Fahrenheit, beyond which the survival of beneficial bacteria is affected, a standard process cycle of ¾ turn drum rotation and exhaust fan operation are automatically commenced by the controller, after which the materials temperature is again reinitiated. More frequent drum rotation turns the material more often, causing a decrease in the materials temperature through greater convective and radiated heat transfer to the interior air, and the attendant air change produced by operation of the exhaust fan.

Figure 2:
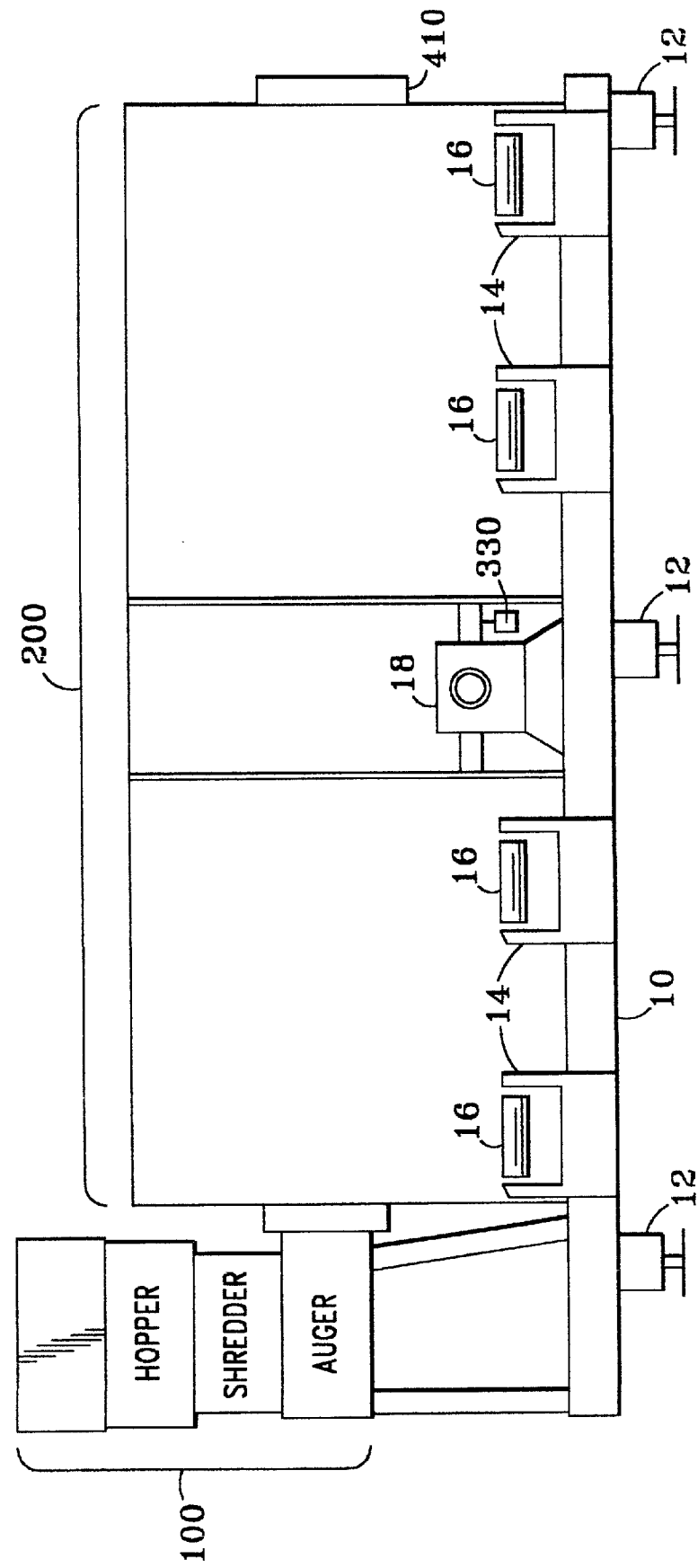
FIG. 2 is a diagrammatic side elevation of the embodiment of FIG. 1, showing the hopper, shredder, feed auger, three chamber drum with support and drive mechanism, all mounted on a base frame.

Referring now to FIGS. 1 and 2, specifically addressing the in-drum composting process, there is illustrated an infeed section 100, drum section 200, process control system 300, and closed compost container 400. The infeed section, drum section and process control system are mounted on base frame 10, which is leveled by adjustable legs 12, and suitably enclosed and insulated by enclosure 20 to operate as a unitary composting system. Access panels 22 provide access for maintenance purposes. The closed compost container 400 is closely coupled to the back end of drum section 200, while providing limited venting capability at the point of coupling 410. Enclosure 20 is substantially closed to drafts, but is not necessarily pressure proof, natural outgassing occurring by design in the venting noted at coupling 410 when the exhaust fan is not running.

Figure 3:
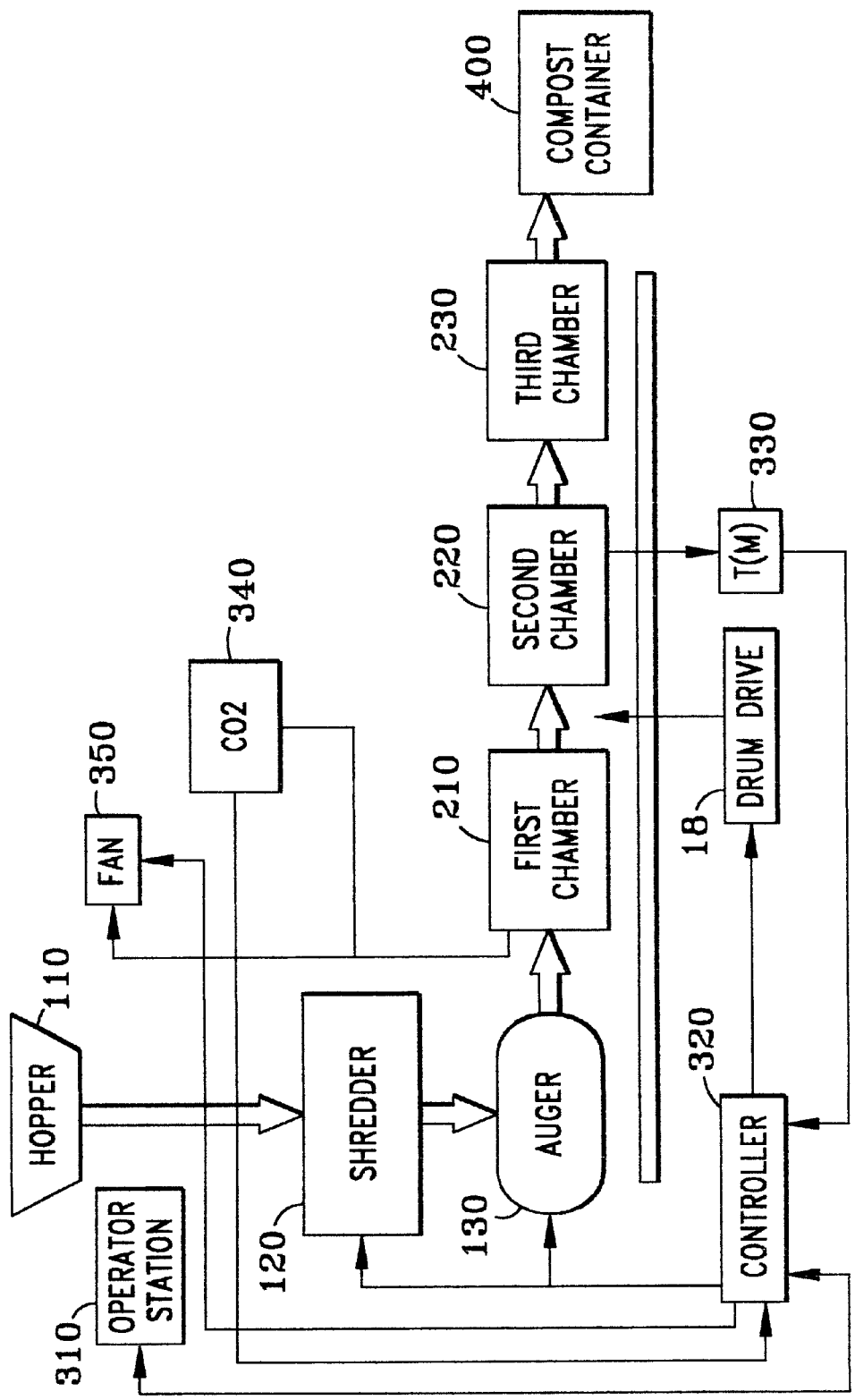
FIG. 3 is a block diagram illustrating the principal elements and the process flow of the preferred embodiment.
Figure 5:
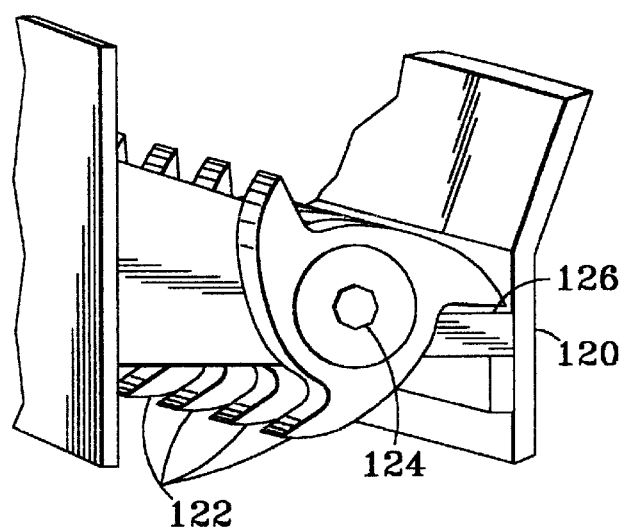
FIG. 5 is a partial perspective view of the shredder of the preferred embodiment, with its shaft-mounted rotating cutter blades.
Figure 6:
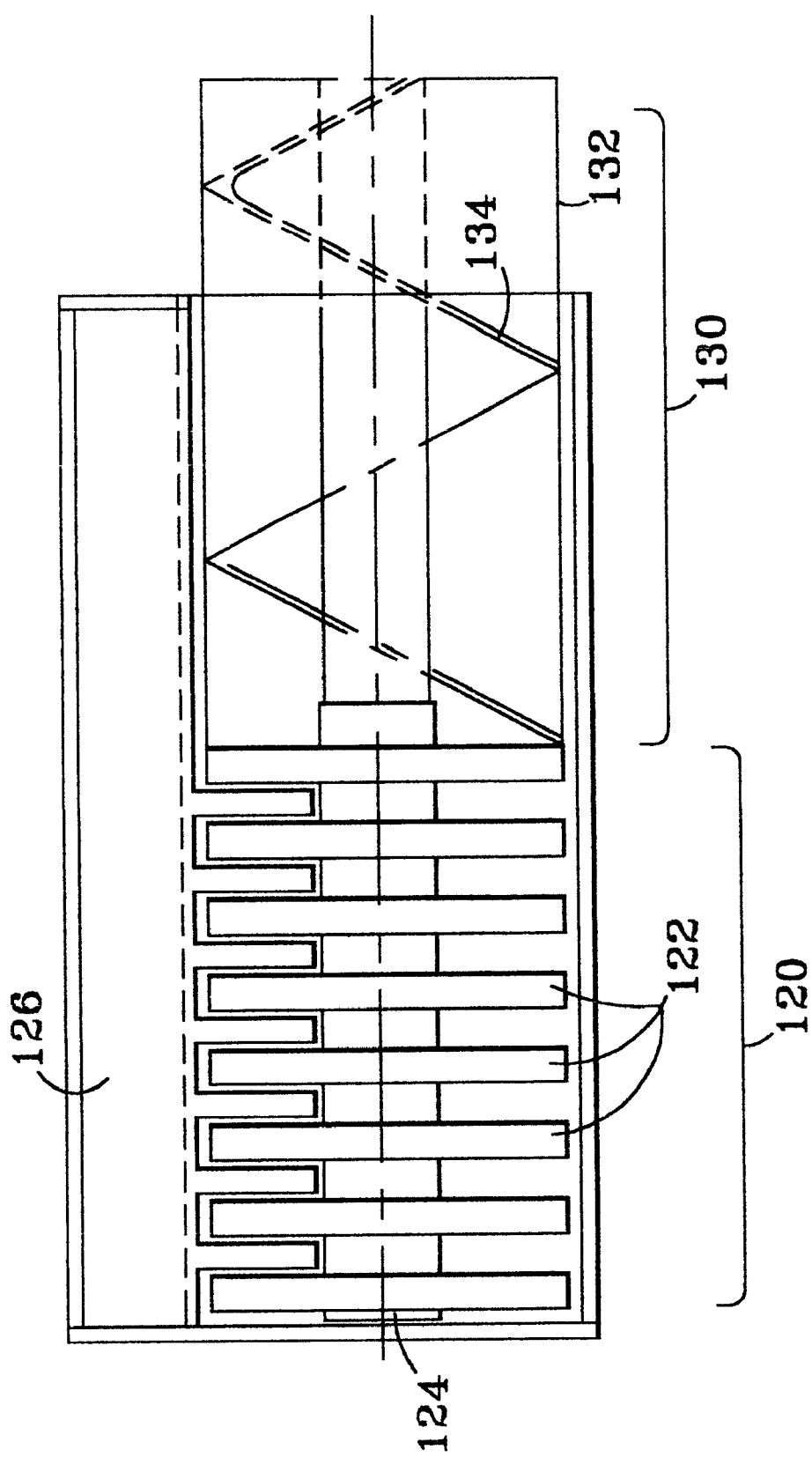
FIG. 6 is a partial cut-away top view of the shredder and auger sections, showing part of the rotating cutter blades and interspersed teeth of the stationary striking plate, and beneath it the vanes of the auger.

Referring to FIGS. 3, 5 and 6, Infeed section 100 has a feed hopper 110 about 40 inches by 20 inches and 30 inches deep, that is closed between feedings by hopper lid 112. The hopper feeds vertically downward into shredder 120. The shredder is a material shredder/particle sizer powered by an electric motor, consisting of a series of spaced apart multi-toothed blades 122 on a rotating shaft 124 that rotate past a toothed striking plate 126, and operates at 30 to 90 RPM. The tooth size, blade size and spacing is calculated to tear and shred the supplied materials into particles not larger than 1×1×3 inches. The shredder is capable of handling the raw food waste, including bones, as well as supplemental bulk materials such as cardboard.

Shredder 120 feeds vertically downward into auger 130, which is horizontally oriented and likewise powered by an electric motor. The one by four foot chute 132 and vanes 134 of auger 130 deposit the shredded material into the drum section.

Figure 4:
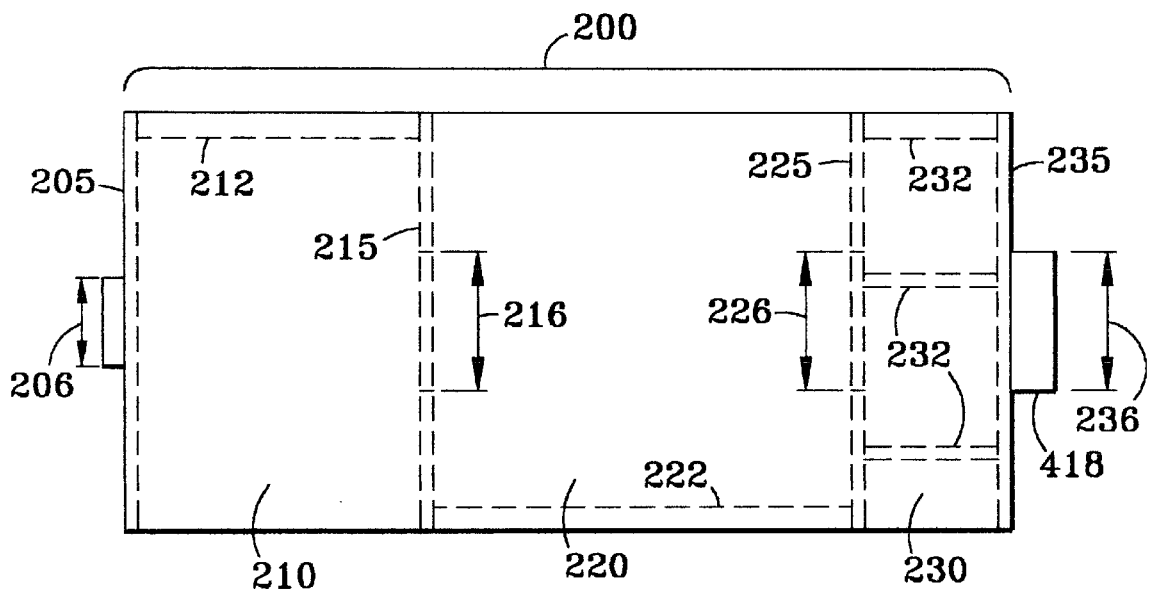
FIG. 4 is a side elevation cross section of the three chamber drum of the preferred embodiment.

Referring to FIG. 4, drum section 200 consists of a 4800 gallon, 7.5 foot diameter, 30 foot long drum 201, which has a front end 205 and back end 235, with interior partitions 215 and 225 segregating the interior volume into three chambers, 210, 220, and 230 respectively. Chambers 210 and 220 each have single horizontal vanes 212 and 222 respectively, of about four inches height running the length of their respective chambers, attached perpendicular to the drum wall and to the end walls of the chambers. Chamber 230 has three, radially spaced vanes 232, similar to vanes 212 and 222.

The first chamber, 210, holds about 8 cubic yards of working volume of materials in process, retaining about 6 yards if input slows or ceases, and has a throughput cycle of about two to six days. The second chamber, 220, has a capacity of about 11 cubic yards, retaining about 8½ yards if input slows or ceases, and has a throughput cycle of about four to 10 days. The third chamber, 230, holds about 4¾ cubic yards, retaining about 3¾ yards if inflow slows or ceases. The external catch box, compost container 400, has a 5½ yard capacity.

Drum 201 is preferably fabricated of stainless steel, however, it could be made of any other suitable material. Drum 201 is mounted horizontally on the base frame 10 so as to be ratable on drum supports 14 and drum support rollers 16 by motorized drum drive system 18 consisting of a motor and gearbox coupled to a dual chain assembly. Drive system 18 incorporates an automatic brake feature to prevent roll back of the drum after rotation, due to the displacement of the contents in the direction of rotation.

Interior partitions 215 and 225 of drum 201 are substantially planar, and perpendicular to the axis of the drum. Drum front end 205 has a relatively small axial port 206 of about 12 inches diameter, through which auger 130 deposits the shredded materials. Partitions 215 and 225 have relatively larger axial ports 216 and 226 of 14 and 16 inches diameter, respectively. Drum back end 235 has an axial port 236 of 18 inches diameter.

Referring to FIG. 3, the complete process path through the apparatus is into hopper 110, through shredder 120, via auger 130 through port 206 into chamber 210, and successively through chambers 220, 230, as moved by drum rotation and the gradual down slope flow through successively larger ports, through port 236 into compost container 400, from which the finished compost is periodically removed.

Again referring to FIG. 3, process control system 300 consists of operator's station 310, process controller 320 and process sensors including temperature sensor 330, an optional $CO_2$ or Oxygen sensor 340, and a biofilter equipped exhaust fan 350. The controller also receives inputs from an operator switch at operator's station 310, and various safety switches on the apparatus. The controller output controls shredder 120, auger 130, drum drive system 18, and exhaust fan 350. The duct for exhaust 350 is connected at the front end of the system so as to exhaust interior air and draw makeup air in from the vents at coupling 410 at the back end of the apparatus. Operator's station 310 is provided with temperature level readout and optional carbon dioxide level readout.

Temperature sensor 330 is located at the base of the drum in the area of the center chamber. The sensor assembly alternately bears on the exterior wall of center chamber 220 when the drum is not rotating, and is lifted clear by a cam when the drum is rotating. Sensor 330 contacts the drum at any point rotationally forward of bottom dead center where the center of mass of contained material is concentrated by the rotating action of the drum.

An alternative temperature sensing arrangement is provided by installing sensors in the second chamber at indexed stopping points where one will always be embedded in the material in process when the rotation stops. A connection is made through the drum wall between the sensor and an external, coincident pickup point, connecting to the controller.

Specifically addressing the liquid handling system now, to accomplish the goals of the dual mode compost tea and dry waste composting process in the apparatus of the invention, the preferred embodiment is further configured as follows. The first chamber has four screened drainage ports equally spaced about the circumference of the drum and oriented so that when the drum is stationary at any of the four possible stop positions (for a system configured to have 270 degree rotation cycles), the excess liquid not entrained in the food waste materials drains into a catch basin or tank below the first chamber. A small compressor and air tank automatically provides a short blast of air through a nozzle adjacent to the drum, into each port in turn as it is rotated into position in front of the nozzle. This assures that the port screen is clear for draining when it rotates to the bottom side of the drum.

The composting process of the materials within the drum proceeds as previously described, into and out of the second chamber and into the third chamber, as a relatively dry, reduced volume, fully composted end product. The level of the immediately drained liquid is float-monitored and pumped as necessary up to a primary holding tank of four days capacity, suspended high in the insulated enclosure of the system. The temperature of the liquid in the holding tank tends to rise to the ambient temperature within the enclosure.

Should the volume of liquid in the primary holding tank exceed the four day capacity due to an occasionally exceptionally large volume of liquid in the food waste being entered into the composting system, an overflow outlet will drain the excess back into the first chamber of the drum; thus using the first chamber as a buffer or overflow absorption vehicle for relatively brief periods when the liquid content of the raw waste input is exceptionally high.

A second tank suspended above the second chamber of the drum will receive the liquid from the first holding tank on a batch basis every 72 hours, presently a regulatory minimum for such processes, and hold the liquid at between 132 and 158 degrees Fahrenheit, for the same reasons described above for the in-drum composting process. At the end of the 72 hour period, the contents of the second tank are pumped or drained into a third tank, and the second tank is then refilled from the first tank.

The underside shape of the first and second tanks in particular closely conform with and are suspended very close to the upper surface of the drum. There is sufficient clearance for the drum to revolve, while still assuring good thermodynamic transfer of heat from the in-drum process to the liquid tanks, to help maintain the desired temperatures in the tanks.

The third tank is configured to drain the volume of liquid received from the second tank, into the third chamber of the drum, through the uppermost of four screened ports spaced about the third chamber, the ports being similar to those used for draining liquid out of the first chamber. There is no requirement for clearing these ports with compressed air, as the topside inflow of liquid self cleans any materials accumulated on the screen during the underside outflow of liquid.

The warm liquid entering the third chamber of the drum percolates through the mature compost developed by the in-drum composting, and drains through the lowermost of the four ports as rich, compost tea, into a holding tank under the drum. This tank is selected or designed to fit the available space under the drum, and is equipped with an evaporator, the combination of tank size and evaporation capacity providing sufficient volume to hold about one week accumulation of concentrated liquid product so as to be conveniently emptied on the same cycle as the dry compost. Electrical power is supplied for compressor, transfer pumps, and supplemental heat, in addition to drum rotating and fans. Corresponding control circuit components including liquid level sensors such as float switches and temperature sensors are provided. The entire system is insulated and enclosed to maintain temperature stability.

It should be noted that the materials and individual components from which the various embodiments are constructed are not of themselves novel or unusual, and so are not illustrated in detail. This in no way detracts from a clear understanding of the invention for practitioners skilled in the art.

Figure 7:
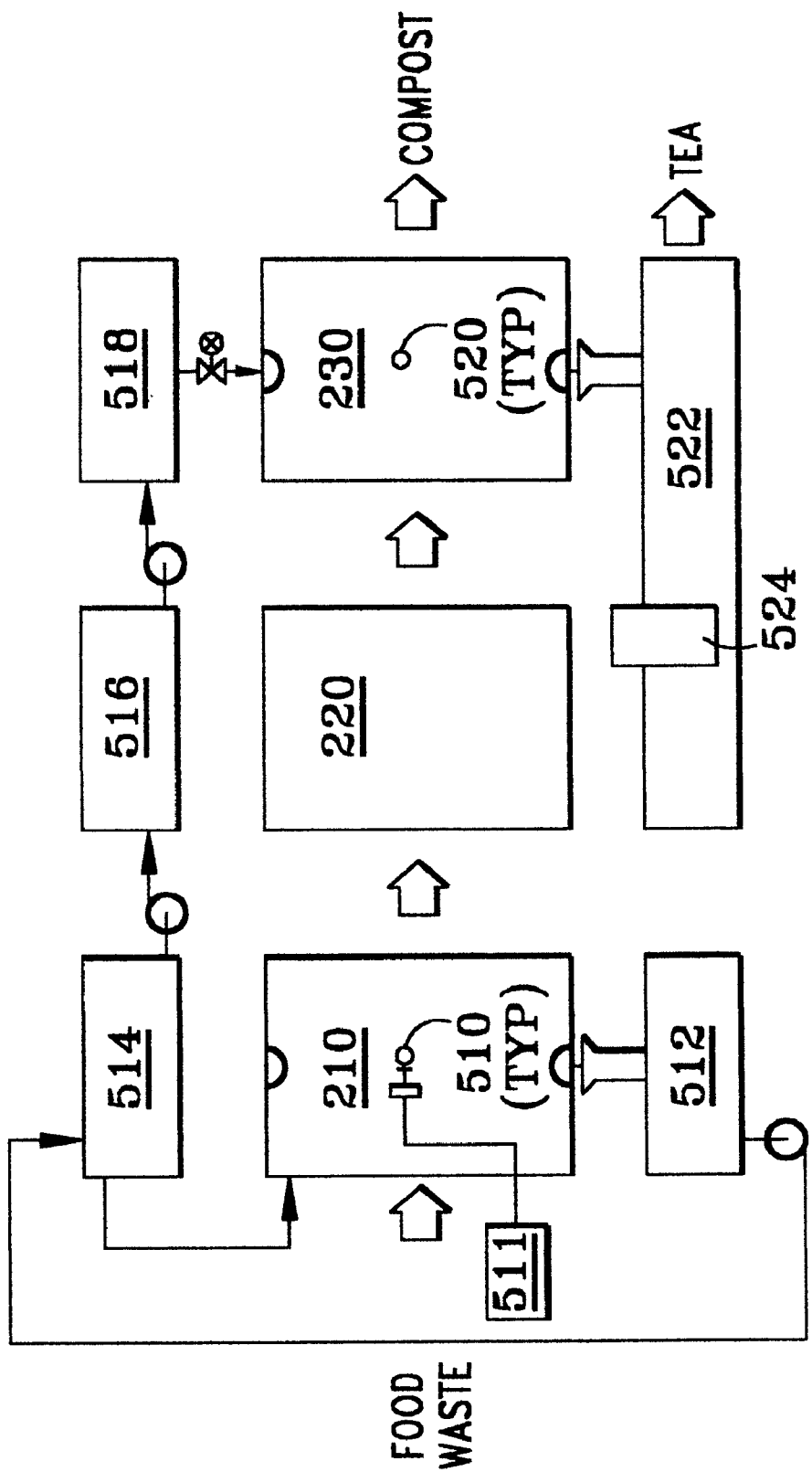
FIG. 7 is a flow chart of the dual process embodiment of the invention, consisting of the system of FIG. 3, further configured to provide drainage of the first chamber, a separate fluid processing path, and subsequent percolation of the processed fluid through the third chamber to create compost "tea".

Referring to FIG. 7, again specifically addressing the liquid handling system, the apparatus of FIG. 3 is further modified as follows: first chamber 210 has four screened drainage ports 510 equally spaced about the circumference of the drum, and a catch basin or tank 512 of 130 gallons capacity, located below the first chamber. Air compressor 511 is configured to give a short blast of compressed air into each port successively, when it is clear of the bottom side drainage position, in order to clear the screen. Tank 512 is equipped with a float switch and pump, the discharge of which is connected to a primary holding tank 514 of 330 gallons capacity, suspended high in the insulated enclosure of the system and in close proximity to the top of drum 200. An overflow outlet on tank 514 discharges back into chamber 210.

Tank 516 of 275 gallons capacity is suspended above and in close proximity to second chamber 220 of drum 200. Tank 516 is equipped with electric heat pads thermostatically controlled to assure that the contents of the tank are maintained within the desired temperature range.

Tank 518 of 275 gallons capacity is similarly suspended over third chamber 230. Tank 516 is configured with inlet and outlet pumps and connecting lines, controlled by timers, to provide for discharging into tank 518 and then recharging from tank 514, every 72 hours.

Chamber 230 is configured with four screened ports 520 equally spaced about its circumference similar to ports 510 in the first chamber. Tank 518 is configured to discharge its contents through the topside port 510, between drum advances as were described previously, at a rate calculated to empty the tank into chamber 230 in under 72 hours or the time for which tank 516 is normally cycled.

Catch tank 522 of 550 gallons capacity is arranged below drum 200 and chamber 230 to receive the outflow of liquid from the bottom side screened port 510. Tank 522 is equipped with evaporator 524, which is configured to reduce the collected liquid volume by up to 75% over the collection cycle, providing a more concentrated liquid and an extended period between batch removals by tank truck or otherwise.

As will be realized, the invention is capable of other and different embodiments, and its several details are capable of modifications in various obvious respects, all without departing from the essence of the invention. For instance, the invention may be practiced as an apparatus and/or process, and can be scaled, so long as the critical parameters of the process are satisfied. A small version of the embodiment would be practical for a home owner, an intermediate version is practical for use by a restaurant or supermarket, and a large version would be practical for a municipal collection/drop-off facility.

By way of illustrating several of the many embodiments, there is within the scope of the invention, an in-vessel composting apparatus for continuous processing of food waste into bulk composting material and liquid compost tea, consisting of an insulated apparatus enclosure, a rotable horizontal drum with an input end having an axial input port and an output end having a relatively larger axial discharge port, where the drum is divided in length by interior partitions into at least first, second and final chambers, each partition having an axial port by which the adjacent chambers are connected. It may include a compost tea holding tank. It will have means for shredding and inserting the food waste into the first chamber, and for draining and collecting excess fluid from the first chamber. It will pass the remaining food waste in periodic small increments amounts from the first chamber to the second chamber where the primary composting action takes place, and from there as bulk compost material into the final chamber. It may have means for permitting low pressure outgassing from the drum, as well as means for measuring temperature in the drum, especially in the second chamber. It will also have means for incrementally rotating the drum about its axis and for exchanging air in the drum for outside air.

Additionally, it will have means for containing a batch volume of the excess fluid at elevated temperature for a predetermined holding period, and for then percolating that batch volume at a calibrated rate of flow into the final chamber and out of the final chamber as compost tea, collecting it in a compost tea holding tank for eventual retrieval and reprocessing as a commercial product.

There may be an operator station and an electronic controller or equivalent, where the controller is connected to the shredder and inlet machinery, to the drum rotation mechanism, to the temperature sensors, to the ventilation system for air changes. The drum may be supported on a base frame with drum supports and drum support rollers and a motorized drum drive system consisting of a motor and gearbox attached to the base frame and coupled to the drum by at least one endless belt or chain.

There may be drainage and collection of excess fluid from the first chamber by use of drainage holes about the circumference of the first chamber, a primary holding tank, and means for directing or pumping the drainage into the primary holding tank. The primary holding tank may be configured with an overflow outlet discharging into the first chamber.

Holding a batch volume of excess fluid at elevated temperature may be done by using a batch volume holding tank with alternately openable inlet and outlet valves, and a separate a percolation tank, where a predetermined batch volume of the excess fluid from the primary holding tank is pumped by a pump through the open inlet into the batch volume holding tank, the outlet being closed, then held at elevated temperature with supplemental heat if needed, for the pre-determined holding period which may be set by regulation, and then pumping out the batch volume through the outlet into the percolation tank, and admitting a new batch volume into the batch volume holding tank.

Percolating the batch volume through the final chamber may be done using drainage inlets and outlets distributed about the circumference of the final chamber, emitting a calibrated flow of excess fluid from the percolation tank through suitable plumbing into the final chamber by letting it run in through the drainage inlets, then collecting and directing resultant drainage of compost tea from the outlets into the compost tea holding tank.

A continuous process for in-vessel composting of food waste into bulk composting material and liquid compost tea, consists of the steps of shredding the food waste into small particles of not greater than four cubic inches, inserting the shredded food waste into a first chamber of a rotable drum consisting of at least three chambers serially connected by axial ports and having means for gradual advancement of the food waste through the chambers while composting, such that a bulk composting material is deposited in the final chamber of the three chambers, draining and collecting the excess fluid from the first chamber, holding a batch volume of excess fluid at elevated temperature for a pre-determined holding period, percolating at a calibrated flow rate said excess fluid through drainage inlets into the final chamber, and collecting the resultant drainage of what is now compost tea from the drainage outlets in the final chamber.

The process may consist of the further steps of permitting low pressure outgassing from the drum, measuring temperature in the second chamber, incrementally rotating the drum about its axis, and periodically exchanging air in the drum for outside air. The process may be conducted within an insulated enclosure. And of course, it may be conducted using a computer or controller for integrating and automating the several steps of the process.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. An in-vessel composting apparatus for continuous processing of food waste into bulk composting material and liquid compost tea, comprising:
   a rotable horizontal drum with an input end having an axial input port and an output end having a relatively larger axial discharge port, said drum divided in length by interior partitions into at least first, second and final chambers, each said partition having an axial port by which adjacent said chambers are connected,
   a compost tea holding tank,
   means for shredding and inserting said food waste into said first chamber,
   means for draining and collecting excess fluid from said first chamber,
   means for passing remaining said food waste in incremental amounts from said first chamber to said second chamber and from said second chamber as bulk composting material into said final chamber,
   means for permitting low pressure outgassing from said drum,
   means for measuring temperature in said second chamber,
   means for incrementally rotating said drum about its axis,
   means for exchanging air in said drum for outside air,
   means for containing a batch volume of said excess fluid at elevated temperature for a predetermined holding period,
   means for percolating said batch volume of excess fluid into said final chamber and out of said final chamber as compost tea into said compost tea holding tank.

2. An in-vessel composting apparatus according to claim 1, further comprising an operator station and a controller, said controller communicating with at least: said means for shredding and inserting, said means for incrementally rotating said drum, said means for measuring temperature, said means for exchanging air, and said operator station.

3. An in-vessel composting apparatus according to claim 2, said means for shredding and inserting comprising an input hopper connecting to a multi-toothed rotary shredding mechanism connecting to an auger and chute assembly connecting to said axial input port of said input end of said drum.

4. An in-vessel composting apparatus according to claim 3, said axial ports being of sequentially larger diameter from said input port to said discharge port.

5. An in-vessel composting apparatus according to claim 4, said chambers further comprising interior structure for tumbling contents during rotation, said structure oriented parallel to said axis of said drum.

6. An in-vessel composting apparatus according to claim 5, said means for incrementally rotating said drum comprising a base frame with drum supports and drum support rollers upon which said drum rests, and a motorized drum drive system comprising a motor and gearbox attached to said base frame and coupled to said drum by at least one endless belt.

7. An in-vessel composting apparatus according to claim 4, further comprising an insulated apparatus enclosure.

8. An in-vessel composting apparatus according to claim 7, said means for exchanging air in said drum for outside air comprising an exhaust fan and duct, said duct connecting to said drum in the vicinity of said input end.

9. An in-vessel composting apparatus according to claim 1, said means for draining and collecting excess fluid comprising said first chamber configured with drainage holes about its circumference, a primary holding tank, and means for directing drainage of said excess fluid from said drainage holes into said primary holding tank.

10. An in-vessel composting apparatus according to claim 9, further comprising said primary holding tank configured with an overflow outlet discharging into said first chamber.

11. An in-vessel composting apparatus according to claim 10, said means for containing a batch volume of said excess fluid comprising a batch volume holding tank with alternately openable inlet and outlet valves, a percolation tank, means for pumping a said batch volume of said excess fluid from said primary holding tank through said inlet into said batch volume holding tank, means for timing said holding period, and means for pumping out said batch volume from said batch volume holding tank through said outlet into said percolation tank.

12. An in-vessel composting apparatus according to claim 11, said means for percolating said batch volume comprising, drainage inlets and outlets distributed about the circumference of said final chamber, means for emitting a calibrated flow of said excess fluid from said percolation tank into said final chamber through said drainage inlets, means for collecting and directing resultant drainage of said compost tea from said outlets into said compost tea holding tank.

13. An in-vessel composting apparatus for continuous processing of food waste into bulk composting material and liquid compost tea, comprising:

an insulated apparatus enclosure,
   a rotable horizontal drum with an input end having an axial input port and an output end having a relatively larger axial discharge port, said drum divided in length by interior partitions into at least first, second and final chambers, each said partition having an axial port by which adjacent said chambers are connected,
   a compost tea holding tank,
   means for shredding and inserting said food waste into said first chamber,
   means for draining and collecting excess fluid from said first chamber,
   means for passing remaining said food waste in incremental amounts from said first chamber to said second chamber and from said second chamber as bulk composting material into said final chamber,
   means for permitting low pressure outgassing from said drum,
   means for measuring temperature in said second chamber,
   means for incrementally rotating said drum about its axis,
   means for exchanging air in said drum for outside air,
   means for containing a batch volume of said excess fluid at elevated temperature for a predetermined holding period,
   means for percolating said batch volume of excess fluid into said final chamber and out of said final chamber as compost tea into said compost tea holding tank, and
   an operator station and a controller, said controller communicating with said means for shredding and inserting, said means for incrementally rotating said drum, said means for measuring temperature, said means for exchanging air, and said operator station, said means for shredding and inserting comprising an input hopper connecting to a multi-toothed rotary shredding mechanism connecting to an auger and chute assembly connecting to said axial input port of said input end of said drum, said axial ports being of sequentially larger diameter from said input port to said discharge port, said chambers further comprising interior structure for tumbling contents during rotation, said structure oriented parallel to said axis of said drum, said means for incrementally rotating said drum comprising a base frame with drum supports and drum support rollers upon which said drum rests, and a motorized drum drive system comprising a motor and gearbox attached to said base frame and coupled to said drum by at least one endless belt, said means for exchanging air in said drum for outside air comprising an exhaust fan and duct, said duct connecting to said drum in the vicinity of said input end.

14. An in-vessel composting apparatus according to claim 13, said means for draining and collecting excess fluid comprising said first chamber configured with drainage holes about its circumference, a primary holding tank, and means for directing drainage of said excess fluid from said drainage holes into said primary holding tank, said primary holding tank configured with an overflow outlet discharging into said first chamber.

15. An in-vessel composting apparatus according to claim 14, said means for containing a batch volume of said excess fluid comprising a batch volume holding tank with alternately openable inlet and outlet valves, a percolation tank, means for pumping a said batch volume of said excess fluid from said primary holding tank through said inlet into said batch volume holding tank, means for timing said holding period, and means for pumping out said batch volume from said batch volume holding tank through said outlet into said percolation tank.

16. An in-vessel composting apparatus according to claim 15, said means for percolating said batch volume comprising, drainage inlets and outlets distributed about the circumference of said final chamber, means for emitting a calibrated flow of said excess fluid from said percolation tank into said final chamber through said drainage inlets, means for collecting and directing resultant drainage of said compost tea from said outlets into said compost tea holding tank.

17. A continuous process for in-vessel composting of food waste into bulk composting material and liquid compost tea, comprising the steps of:

shredding said food waste into small particles of not greater than four cubic inches, inserting said food waste into a first chamber of a rotable drum comprising at least three chambers serially connected by axial ports and having means for gradual advancement of said food waste through said chambers while composting, such that a bulk composting material is deposited in the final chamber of said three chambers, draining and collecting the excess fluid from said first chamber, holding a batch volume of said excess fluid at elevated temperature for a predetermined holding period, percolating at a calibrated flow rate said excess fluid through drainage inlets into the final chamber of said chambers, and collecting resultant drainage of said compost tea from drainage outlets in said final chamber.

18. A continuous process for in-vessel composting according to claim 17, further comprising the steps of:

permitting low pressure outgassing from said drum, measuring temperature in said second chamber, incrementally rotating said drum about its axis, and periodically exchanging air in said drum for outside air.

19. A continuous process for in-vessel composting according to claim 18, further comprising the conducting of said process within an insulated enclosure.

20. A continuous process for in-vessel composting according to claim 19, further comprising the step of using a controller for integrating and automating the several said steps.

* * * * *